United States Patent [19]

Mullani

[11] Patent Number: 4,642,464

[45] Date of Patent: Feb. 10, 1987

[54] POSITRON EMISSION TOMOGRAPHY CAMERA

[75] Inventor: Nizar A. Mullani, Houston, Tex.

[73] Assignee: Clayton Foundation for Research, Houston, Tex.

[21] Appl. No.: 768,906

[22] Filed: Aug. 23, 1985

Related U.S. Application Data

[63] Continuation-in-part of Ser. No. 613,699, May 24, 1984, Pat. No. 4,563,582.

[51] Int. Cl.$^4$ .............................................. G01T 1/164
[52] U.S. Cl. .................. 250/363 S; 250/366; 250/367
[58] Field of Search .................. 250/363 SA, 367, 366

[56] References Cited

U.S. PATENT DOCUMENTS 4,394,576 7/1983 Tanaka et al. ...................... 250/366

Primary Examiner—Carolyn E. Fields
Attorney, Agent, or Firm—Fulbright & Jaworski

[57] ABSTRACT

A position emission tomography camera having a plurality of detector planes positioned side-by-side around a patient area to detect radiation. Each plane includes a plurality of photomultiplier tubes and at least two rows of scintillation crystals on each photomultiplier tube extend across to adjacent photomultiplier tubes for detecting radiation from the patient area. Each row of crystals on each photomultiplier tube is offset from the other rows of crystals, and the area of each crystal on each tube in each row is different than the area of the crystals on the tube in other rows for detecting which crystal is actuated and allowing the detector to detect more interplane slices. The crystals are offset by an amount equal to the length of the crystal divided by the number of rows. The rows of crystals on opposite sides of the patient may be rotated 90 degrees relative to each other.

7 Claims, 13 Drawing Figures

U.S. Patent   Feb. 10, 1987   Sheet 1 of 3   4,642,464
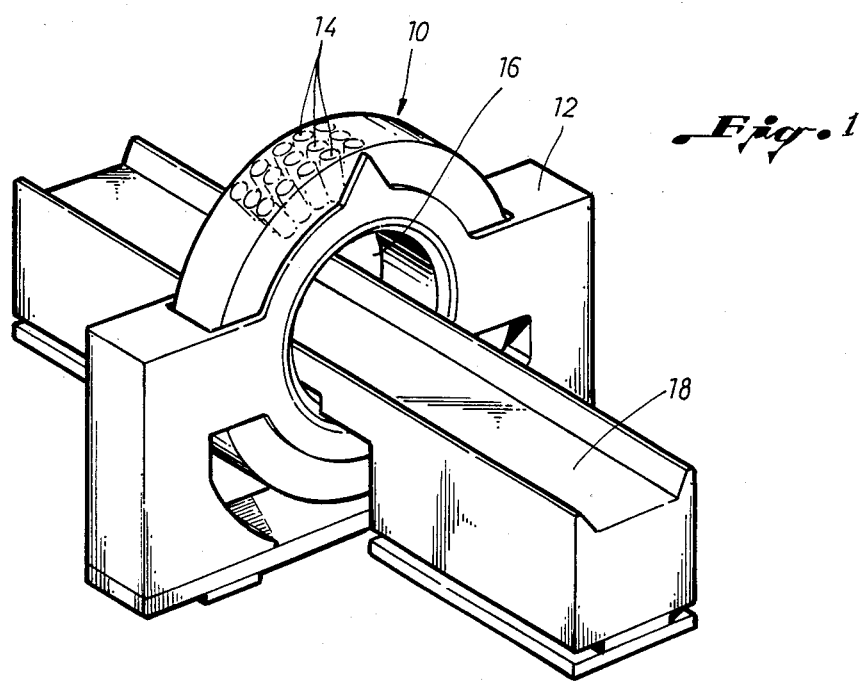
*Fig. 1*
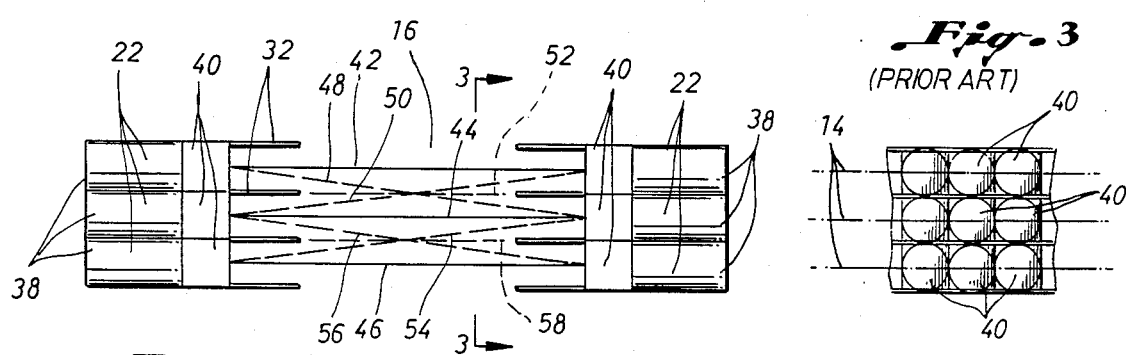
*Fig. 2*
(PRIOR ART)
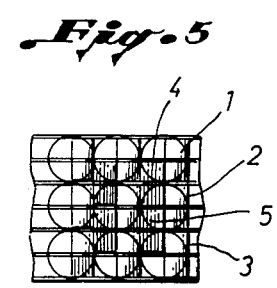
*Fig. 3*
(PRIOR ART)
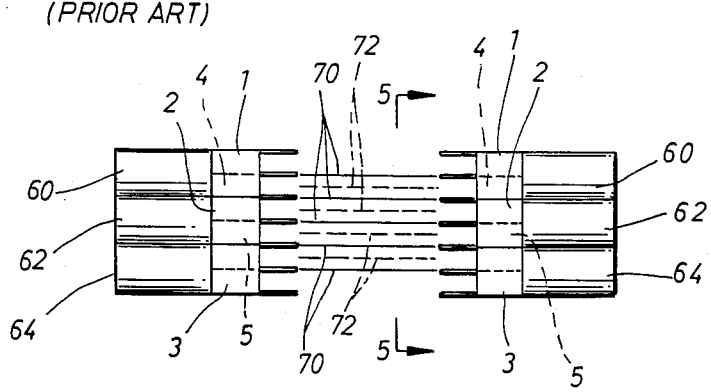
*Fig. 4*
*Fig. 5*

4,642,464

POSITRON EMISSION TOMOGRAPHY CAMERA

CROSS-REFERENCE TO RELATED APPLICATIONS

This application is a continuation-in-part of my copending patent application Ser. No. 06/613,699, filed May 24, 1984, now U.S. Pat. No. 4,563,582, entitled Positron Emission Tomography Camera.

BACKGROUND OF THE INVENTION

The value of the positron emission tomography camera for assessing in-vivo biochemical behavior and its usefulness for clinical diagnosis of the human body is well known.

The present invention is directed to various improvements in a positron emission tomography camera and in particular to the detectors to provide better resolution and increase number of image planes, better data sampling, a reduction in photomultiplier tubes, and a reduction in scintillation crystal size, with a consequent reduction in cost.

SUMMARY

The present invention is directed to a positron emission tomography camera having a plurality of detector planes, such as in the form of rings or plates positioned side-by-side around a patient area to detect radiation therefrom. Each plane contains a plurality of scintillation detectors pointed to the patient area and each plane of detectors defines a plane slice through the patient area by the detectors in each plane and each two adjacent detector planes defines an interplane slice through the patient area. One feature of the present invention is the improvement in the detectors which includes each detector plane having a plurality of photomultiplier tubes and at least two rows of scintillation crystals on each photomultiplier tube extending across to adjacent photomultiplier tubes for detecting radiation from the patient area which the tubes convert into electrical pulses and in which the multiplier tubes are responsive to all of the rows of crystals on each tube. Each row of crystals on each photomultiplier tube is offset from the other rows of crystals, and the area of each crystal on each tube in each row is different than the area of the crystals on the tube in other rows for detecting which crystal is actuated and for allowing the detectors to detect more interplane slices.

Still a further object of the present invention is wherein the crystals are offset by an amount equal to the length of the crystals divided by the number of rows.

Yet a still further object of the present invention is wherein the rows of crystals on opposite sides of the patient area are rotated 90 degrees relative to each other for improving the sampling for coincidence detectors.

Still a further object of the present invention is wherein each row of crystals is offset an equal amount from the adjacent row of crystals.

Still a further object of the present invention is wherein alternate rows of crystals are offset from adjacent rows of crystals in the opposite direction from the offset of the adjacent rows.

Yet a still further object of the present invention is wherein the detectors include at least three rows of scintillation crystals on each photomultiplier tube extending across to adjacent photomultiplier tubes.

Other and further objects, features and advantages will be apparent from the following description of presently preferred embodiments of the invention, given for the purpose of disclosure and taken in conjunction with the accompanying drawings.

BRIEF DESCRIPTION OF THE DRAWINGS

FIG. 1 is a perspective elevational view of one form of the positron emission tomography camera of the present invention, FIG. 2 is a schematic elevational view, in cross section, illustrating the imaging of plane slices and interplane slices in a conventional positron camera, FIG. 3 is a cross-sectional view taken along the line 3—3 of FIG. 2, FIG. 4 is an elevational schematic view, in cross section, illustrating the present invention and increasing the number of plane and interplane slices being imaged, FIG. 5 is a cross-sectional view taken along the line 5—5 of FIG. 4.

BRIEF DESCRIPTION OF THE PREFERRED EMBODIMENT

Figure 6:
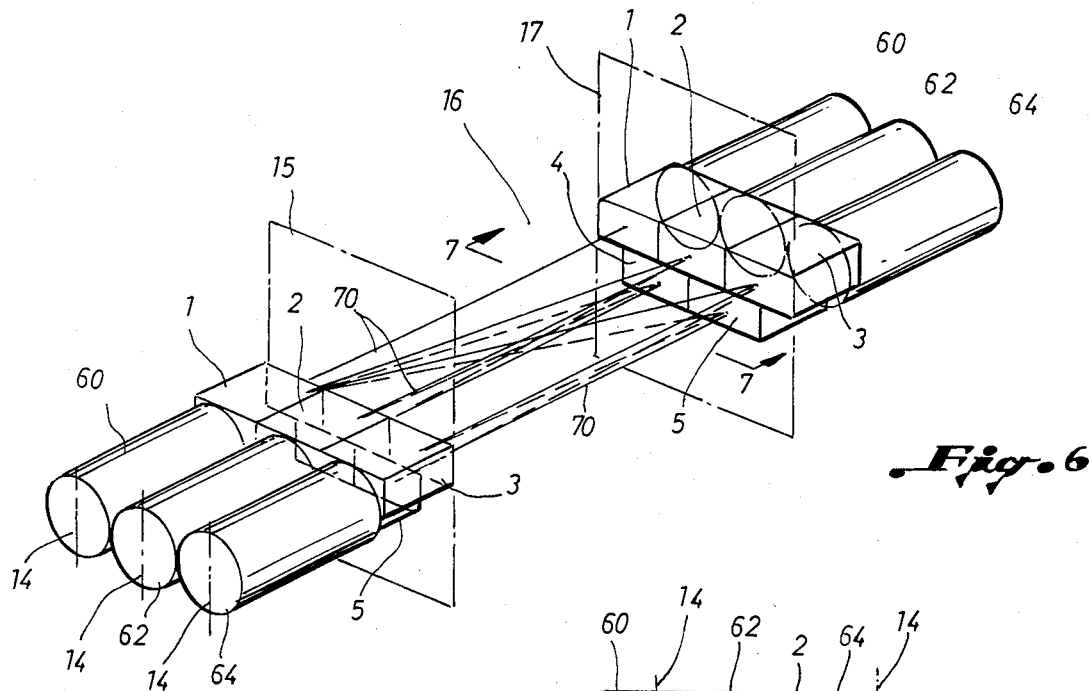
FIG. 6 is an elevational and schematic perspective view illustrating the plane and interplane imaging accomplished by the present invention.

Referring now to the drawings, and particularly to FIG. 1, the reference numeral 10 indicates a positron emission tomography camera having a support or gantry 12, a plurality of detector planes, here shown in the form of three rings 14 for convenience. However, other forms such as opposing plates may be utilized, positioned on opposite sides of a patient area 16 to detect radiation therefrom. The patient area 16 may include a patient bed 18 for supporting a patient and the patient bed 18 may be tilted and/or rotated for scanning the body or an organ from several different positions. The gantry may produce a wobble for increased scanning. The detectors detect radiation which has been injected into the body such as rubidium-82.

Referring now to FIGS. 2 and 3, a cross section of a typical positron camera has an opening 16 for insertion of the patient to be scanned, a plurality of detectors 22 for each detector plane 14 which are mounted around the patient area 16 for detecting radiation from the patient area 16. A typical detector 22 consists of a photomultiplier tube 38 and a scintillation crystal 40 and septa 32. The crystal 40 converts the detected radiation into light which is transmitted to the photomultiplier tube 38 for converting the detected radiation into electrical pulses. Typically for a single tube 38, a single crystal 40 is connected thereto. A typical prior art camera is shown having three planes of detectors 22, each detector including a photomultiplier tube 38 with a single crystal 40. Such a conventional type arrangement provides a total of five slices or images through the patient's body. That is, the detectors 22 which are opposite to each other will provide "straight-on" slices 42, 44 and 46. Interplane slices are detected such as interplane slices 48 and 50 which when added together provide a single "inbetween" slice 52. Similarly, cross slices 54 and 56 when added together provide an "inbetween" slice 58. Thus, prior art cameras provide slices equal to two times the number of rows of detectors minus one.

In order to obtain higher resolution in positron cameras, the detectors have been made smaller, but the number and size of the detectors becomes restrictive. Another feature of the present invention has been provided which allows sharing of one photomultiplier tube by more than one scintillation cyrstal in which the crystals are positioned for ease of identification, also the number of image planes is increased, the effective detector size is made smaller so that resolution is improved by a factor of approximately two or more, but the cost of the camera is reduced because approximately one-half or less the total number of photomultiplier tubes are required as compared to the conventional mode.

Figure 7:
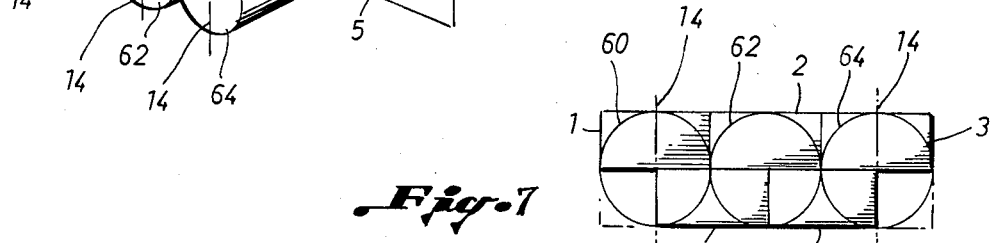
FIG. 7 is a cross-sectional view taken along the line 7—7 of FIG. 6.

Referring now to FIGS. 6 and 7, photomultipliers 60, 62, and 64 are shown which are in different parallel planes 14 in the camera 10. The planes 14 may be rings positioned in planes transverse to the longitudinal axis of the patient area 16, as shown in FIG. 1, or may be in opposed plates 15 and 17 positioned on opposite sides of the patient area 16. In addition, a plurality of scintillation crystals, any suitable type crystal is satisfactory, are positioned around the inside of the detectors 60, 62 and 64 for detecting radiation from the patient area 16 which the crystals convert into light and the photomultipliers convert into electrical pulses. The crystals are positioned relative to the photomultiplier tubes 60 and 62 and 64 whereby each multiplier tube is responsive to more than one crystal. Thus crystals 1, 2 and 3 are seen only by photomultiplier tubes 60, 62 and 64, respectively. Crystals 1, 2 and 3 cover one-half, such as the upper half, of each of the photomultipliers in each of the planes 14. However, crystal 4 is positioned adjacent to and is seen by photomulplier tubes 60 and 62 while crystal 5 is seen by multiplier tube 62 and 64. With this arrangement, the identification of the crystal can readily be made. That is, if crystal 1 is actuated only photomultiplier 60 is responsive. Similarly, if crystal 2 is actuated only photomultiplier 62 is responsive, and if crystal 3 is actuated only photomultiplier 64 is responsive. However, if both photomultiplier 60 and 62 respond, this is an identification of crystal 4. Similarly, crystal 5 will create a response in both photomultiplier tubes 62 and 64. This structure also provides greater resolution as the size of the crystals 1, 2, 3, 4 and 5 are made smaller than the normal crystal size by a factor of 2 as a normal crystal will cover the entire face of the photomultiplier tube. This structure and method also requires fewer multiplier tubes by almost one-half for detecting identification of the crystals. Costs are reduced as the smaller size crystals are less expensive than the larger size crystals. In addition, better data sampling is provided in the slice direction.

Another important feature of the arrangement of the crystals relative to the photomultiplier tubes is the fact that the number of image planes is increased because of the improved sampling of the data provided by the offsetting of the first row of crystals 1, 2 and 3 relative to the second row of crystals 4 and 5. FIGS. 2 and 3 indicated that a prior art three row detector camera will provide three straight-on slices and two effective in-between slices. However, the present improvement, as best seen in FIGS. 4-7, will because crystals 4 and 5 are offset from the crystals 1, 2 and 3, will provide nine effective slices consisting of five straight-on slices and four effective "in between" slices. The straight-on slices are numbered 70 and the effective in-between slices are numbered 72.

Figure 8:
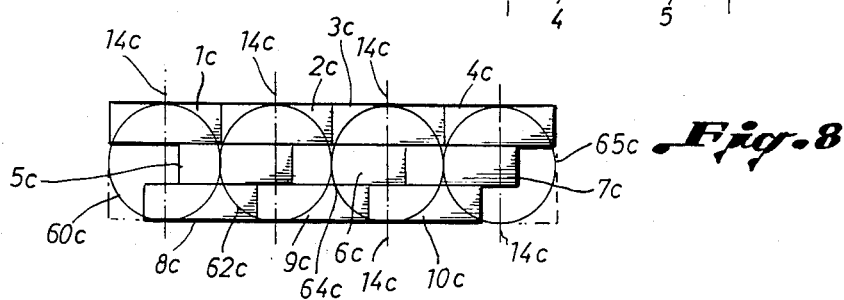
FIG. 8 is an enlarged cross-sectional view, of a another embodiment of detector arrangements.

Referring now to FIG. 8, an arrangement is provided in which four planes or rings 14c contain photomultiplier tubes 60c, 62c, 64c, and 65c, respectively, which are responsive to three rows of crystals. The crystals are 1c, 2c, 3c, 4c, 5c, 6c, 7c, 8c, 9c, and 10c which are positioned in horizontal rows across the rings 14c. If desired, the crystals could be positioned around each of the rings 14c instead of across the plurality of rings 22c, that is positioned vertically instead of horizontally as shown. Thus crystal 1c is identified by a signal from only tube 60c. Crystal 5c is identified by a signal of tube 62c being larger than a signal from tube 60c. Similarly crystal 8c is identified by a signal from tube 60c being larger than a signal from tube 62c. Identification of the other crystals is similar.

The embodiment of FIG. 8 has the advantages of higher resolution, more effective sampling in the image planes, and lower costs because of sharing of the photomultiplier tubes.

The embodiments heretofore disclose using a plurality of scintillation crystals positioned in each plane adjacent the photomultiplier tubes for detecting radiation in which the crystals are positioned on the photomultiplier tubes whereby each photomultiplier tube is responsive to more than one crystal. Each row of crystals on each photomultiplier tube are offset from the other rows of crystal and the area of each crystal on each tube in each row is different from the area of the crystals on the tube in other rows for detecting which crystal is actuated and for allowing the detectors to detect more interplane slices. Preferably, the crystals are offset by an amount equal to the length of the crystal divided by the number of rows. Thus in FIGS. 4-7, the row containing crystals 1, 2 and 3 is offset from the row containing crystals 4 and 5 by a distance of one-half the length of one of the crystals. In FIG. 8, which contain three rows of crystals, the rows are offset a distance of one-third of the length of the crystals. While the width of the crystals as shown is such that the total width of the plurality of rows is equal to the width of the photomultiplier tube, a smaller or larger photomultiplier tube may be used by providing a light guide between the rows of crystals and the photomultiplier tube. In this case the total width of the rows of crystals could be smaller or greater than the width of the photomultiplier tube.

Figure 9:
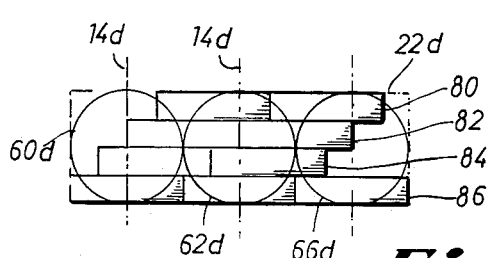
FIG. 9 is an enlarged cross-sectional view of a further embodiment of detector arrangement.
Figure 10:
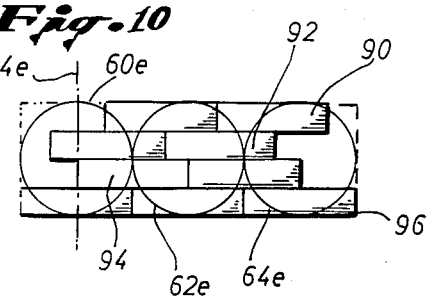
FIG. 10 is an enlarged cross-sectional view of another embodiment of the present invention.

Various other arrangements may be provided to provide a plurality of rows of offset crystals having more than four rows. FIG. 9 shows an arrangement in which the photomultiplier tubes are preferably square or round photomultiplier tubes having square to round light guides and in which rows 80, 82, 84, and 86 are offset from each other by one-fourth of the length of one of the crystals. In this case, it is to be noted that each of the rows 80, 82, 84, and 86 are offset from their adjacent row by one-fourth the length of a crystal. A preferred arrangement of a four row crystal over that of FIG. 9 is that shown in FIG. 10. In this case, the rows 90, 92, 94, and 96, are also offset a distance of one-fourth of the length of a crystal which provides an arrangement, as does claim 9, for detecting in which crystal radiation is measured and for providing a greater number of inter slices. However, FIG. 10 has the advantage over FIG. 9 of providing better sampling. FIG. 10 differs from FIG. 9 in that the alternate rows 90 and 94 are offset from the adjacent rows 92 and 96 in the opposite direction from the offset of the adjacent rows 92 and 94.

Figure 11:
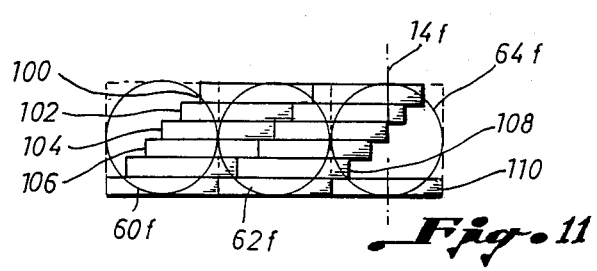
FIG. 11 is an enlarged cross-sectional view, of still a further arrangement of detectors.
Figure 12:
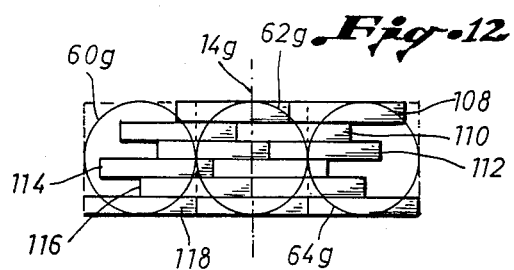
FIG. 12 is an enlarged cross-sectional view of another embodiment of detector arrangement.

Similarly, FIGS. 11 and 12 show an arrangement using six rows of crystals positioned across photomultiplier tubes 22f, which are also preferably include a square end, and which six rows 100, 102, 104, 106, 108, and 110, are provided on each of the tubes 22f and extend across to adjacent photomultiplier tubes in which the tubes 22f are responsive to all of the rows of crystals. In FIG. 11, the rows are offset one-sixth of a length of a crystal from the adjacent row. Again, in FIG. 12 six rows of crystals 108, 110, 112, 114, 116 and 118, are provided on each of the photomultiplier tubes 22g and are offset a distance of one-sixth of a length of a crystal. However, FIG. 12 instead of having the rows offset a distance of one-sixth from each adjacent row as in FIG. 11, the alternate rows 108, 112 and 116 are offset from the adjacent rows 110, 114 and 118 in the opposite direction from the offset of the adjacent rows for again providing a better sampling arrangement than that shown in FIG. 11.

While in all of the embodiments so far, the plurality of rows of crystals have been shown as extending in a horizontal plane, all of the rows can be rotated 90 degrees and thus extend vertically, as discussed in my prior copending patent application to provide thinner in plane slices higher interplane resolution, and higher in plane sampling.

Figure 13:
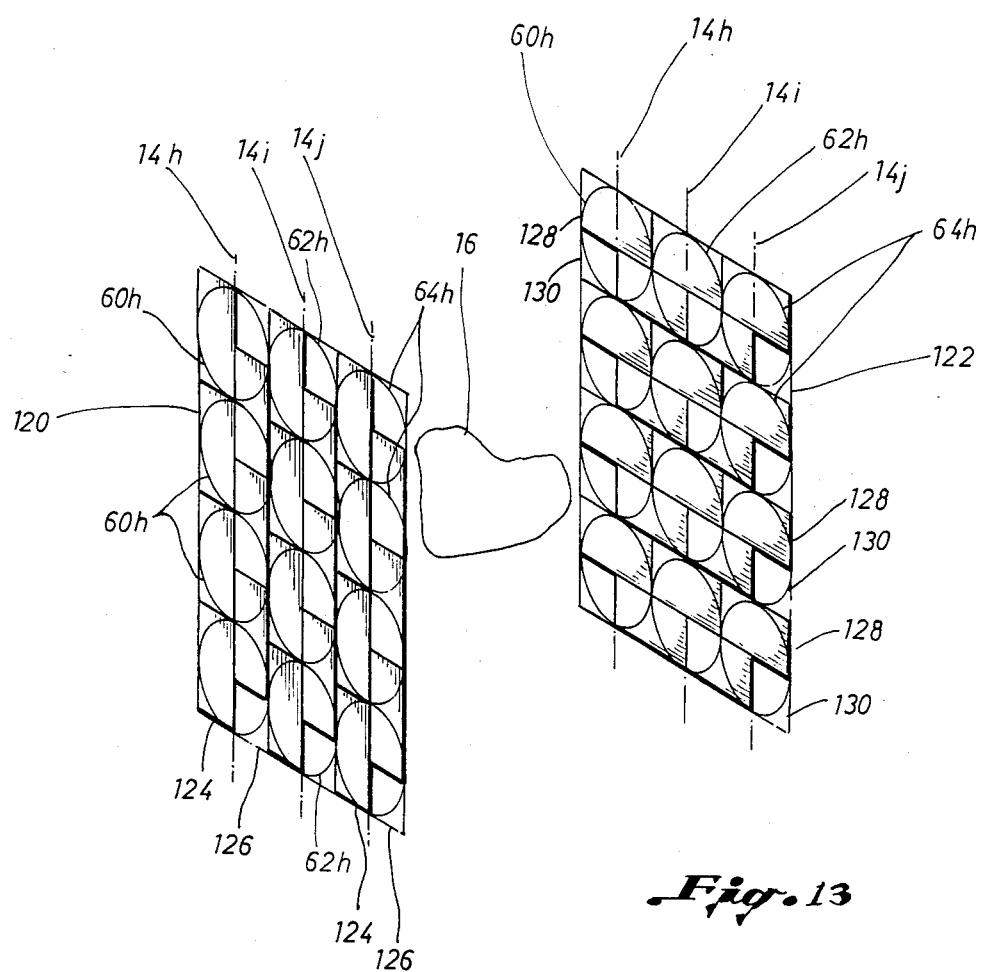
FIG. 13 is an enlarged cross-sectional view, of still a further arrangement of detectors for coincidence planar imaging of an object.

Referring now to FIG. 13, the detectors are positioned in two plates 120 and 122 on opposite sides of the patient area 16 similar to the plates 15 and 17 in FIG. 6. The two plates of detectors of FIG. 6 with offset crystals which are in coincidence which improves sampling and reduces the cost of the detectors. However, in FIG. 13, one of the plates such as plate 120 has its offset rows of crystals extending in a vertical position while the offset rows of crytals in plate 122 extend in a horizontal direction and therefore the detectors in the opposing plates 120 and 122 are in effect rotated 90 degrees relative to each other. This arrangement improves the sampling for coincidence detectors.

Thus, each of the plates 120 and 122 include a plurality of photomultiplier tubes 60h, 62h and 64h arranged in separate planes 14h, 14i and 14j, respectively. Detectors 60h provide one plane slice through the patient area 16, detectors 62h provide a second plane slice and detectors 62h provide a second plane slice and detectors 64h provide a third plane slice. In this example two rows of crystals are provided on each photomultiplier tube with the two rows being offset from each other, similar to the embodiment shown in FIGS. 4-7. Of course, other numbers of rows could be used are described herein. In one of the plates, such as 120, the offset rows of crystals extend in a vertical direction. Thus rows 124 and 126 extend vertically across photomultiplier tubes 60g, 62h and 64h. The adjacent rows are offset from each other by a distance of one-half the length of one of the crystals. On the other plate 122, the rows 128 and 130 extend horizontally across each horizontal row of photomultiplier tubes 60h, 62h and 64h. The rows 128 and 130 are also offset from each other by a distance of one-half the length of one of the crystals.

The present invention, therefore, is well adapted to carry out the objects and attain the ends and advantages mentioned as well as others inherent therein. While presently preferred embodiments of the invention have been given for the purpose of disclosure, numerous changes in the details of construction and arrangement of parts will readily suggest themselves to those skilled in the art and which are encompassed within the spirit of the invention and the scope of the appended claims.

What is claimed is:

1. In a positron emission tomography camera having a plurality of detector planes positioned side-by-side around a patient area to detect radiation therefrom, each plane containing a plurality of scintillation detectors pointed to the patient area, each plane of detectors defining a plane slice through the patient area by the detectors in each plane, and each two adjacent detector planes defining an interplane slice through the patient area, the improvement in the detectors comprising, each detector plane including a plurality of photomultiplier tubes, at least three scintillation crystals positioned on each photomultiplier tube in each plane for detecting radiation from the patient area which the tubes convert into electrical pulses, said crystals positioned on each photomultiplier tube such that whereby each photomultiplier tube is responsive to all of said crystals on the tube, said crystals on each photomultiplier tube being offset from the other crystals on each photomultiplier tube, and the area of each crystal on each photomultiplier tube being different than the area of the other crystals on each photomultiplier tube so as to allow detection of which crystal is actuated and to allow the detectors to detect more interplane slices.

2. The apparatus of claim 1 wherein said crystals are offset by an amount equal to the length of the crystals divided by the number of rows.

3. In a positron emission tomography camera having a plurality of detector planes positioned side-by-side around a patient area to detect radiation therefrom, each plane containing a plurality of scintillation detectors pointed to the patient area, each plane of detectors defining a plane slice through the patient area by the detectors in each plane, and each two adjacent detector planes defining an interplane slice through the patient area, the improvement in the detectors comprising, each detector plane including a plurality of photomultiplier tubes, at least three rows of scintillation crystals on each photomultiplier tube extending across to adjacent photomultiplier tubes for detecting radiation from the patient area which the tubes convert into electrical pulses, and said photomultiplier tubes are responsive to all of said rows of crystals, each row of crystals on each photomultiplier tube being offset from the other rows of crystals, and the area on each crystal on each tube in each row being different than the area of the crystals on the tube in other rows so as to allow detection of which crystal is actuated and to allow the detectors to detect more interplane slices, and said rows of crystals being offset by an amount equal to the length of the crystals divided by the number of rows.

4. The apparatus of claim 3 wherein each row of crystals is offset an equal amount from the adjacent row.

5. The apparatus of claim 3 wherein alternate rows of crystals are offset from adjacent rows of crystals in the opposite direction from the offset of the adjacent rows.

6. In a positron emission tomography camera having a plurality of detector means positioned side-by-side on opposite sides of a patient area to detect radiation therefrom, each plane containing a plurality of scintillation detectors pointed to the patient area, each plane of detectors defining a plane slice through the patient area by the detectors in each plane, and each two adjacent detector planes defining an interplane slice through the patient area, the improvement in detectors comprising, each detector plane including a plurality of photomultiplier tubes,
at least two rows of scintillation crystals on each photomultiplier tube extending across to adjacent photomultiplier tubes for detecting radiation from the patient area which the tubes convert into electrical pulses, and said photomultiplier tubes are responsive to all of said rows of crystals,
each row of crystals on each photomultiplier tube being offset from the other rows of crystals, and the area of each crystal on each tube in each row being different than the area of the crystals on the tube in other rows so as to allow detection which crystal is actuated and to allow the detectors to detect more interplane slices, and
the rows of crystals on opposite sides of the patient area being rotated ninety degrees relative to each other.

7. In a positron emission tomography camera having a plurality of detector planes positioned side-by-side around a patient area to detect radiation therefrom, each plane containing a plurality of scintillation detectors pointed to the patient area, each plane of detectors determining a plane slice through the patient area by the detectors in each plane and each two adjacent detector planes defining an interplane slice through the patient area, the improvement in the planes of detectors comprising, each detector plane including a plurality of photomultiplier tubes,
at least two rows of scintillation crystals pointed in each plane on each photomultiplier tube extending to adjacent photomultiplier tubes for detecting radiation from the patient area which the tubes convert into electrical pulses, and said crystals positioned on the photomultiplier tubes such that each photomultiplier tube is responsive to more than one row of crystals,
each row of crystals on each photomultiplier tube being offset from the other rows of crystals, and the area of each crystal on each tube in each row being different than the area of the crystals on the tube in other rows so as to allow detection of which crystal is actuated and to allow the detectors to detect more interplane slices, and
said crystals being offset by an amount equal to the length of the crystals divided by the number of rows.

* * * * *